United States Patent
Chukka et al.

(10) Patent No.: US 11,038,703 B2
(45) Date of Patent: Jun. 15, 2021

(54) INCORPORATING CONTEXTUAL INFORMATION IN A CONFERENCING SYSTEM

(71) Applicant: International Business Machines Corporation, Armonk, NY (US)

(72) Inventors: Madan K. Chukka, Hyderabad (IN); Purna Chandra Rao Jasti, Hyderabad (IN); Manish Bhide, Hyderabad (IN); Phani Kumar V. U. Ayyagari, Hyderabad (IN)

(73) Assignee: International Business Machines Corporation, Armonk, NY (US)

( * ) Notice: Subject to any disclaimer, the term of this patent is extended or adjusted under 35 U.S.C. 154(b) by 73 days.

(21) Appl. No.: 15/852,724

(22) Filed: Dec. 22, 2017

(65) Prior Publication Data
US 2019/0199541 A1    Jun. 27, 2019

(51) Int. Cl.
*G06F 15/16* (2006.01)
*H04L 12/18* (2006.01)
(Continued)

(52) U.S. Cl.
CPC ........... *H04L 12/1818* (2013.01); *G06N 5/02* (2013.01); *H04L 12/1831* (2013.01);
(Continued)

(58) Field of Classification Search
CPC ..................... G06Q 10/1093; G06Q 10/06311
See application file for complete search history.

(56) References Cited

U.S. PATENT DOCUMENTS 8,358,762 B1 * 1/2013 Renner ................. H04M 3/563
379/202.01
8,364,133 B1 * 1/2013 Lucey ................... H04L 65/403
455/416
(Continued)

FOREIGN PATENT DOCUMENTS

CA         2771503 C      9/2012

OTHER PUBLICATIONS ip.com, "Method to Capture the Subject/Discussion Topic for a New Meeting Using Input from Historical Meeting Corpus using Cognitive Analytics" [online], [Retrieved on Aug. 19, 2017]. Retrieved from the Internet at <URL: https://priorart.ip.com/IPCOM/000248626>, ip.com Disclosure No. IPCOM000248626D, publication date: Dec. 22, 2016, Copyright © 2009-2017 IP.com I, LLC., Total 3 pp.
(Continued)

*Primary Examiner* — Umar Cheema
*Assistant Examiner* — Tesfu N Mekonen
(74) *Attorney, Agent, or Firm* — Konrad Raynes Davda & Victor LLP; Rabindranath Dutta

(57) ABSTRACT

A conference management application for a remote conferencing system stores information on a plurality of users and a plurality of client devices though which the plurality of users communicate with the remote conferencing system. The conference management application transmits information for a remote conference to a user, wherein the information that is transmitted is generated by a cognitive engine via learning mechanisms that iteratively incorporate information on previously completed remote conferences, information on the user, and information on the client device used by the user to communicate with the conference management application.

17 Claims, 11 Drawing Sheets

(51) Int. Cl.
*H04L 29/08* (2006.01)
*G06N 5/02* (2006.01)
(52) U.S. Cl.
CPC .............. *H04L 67/18* (2013.01); *H04L 67/22* (2013.01); *H04L 67/306* (2013.01)

(56) References Cited

U.S. PATENT DOCUMENTS

| | | | | |
|---|---|---|---|---|
| 8,483,375 | B2* | 7/2013 | Dhara | H04L 12/1818 |
| | | | | 370/260 |
| 8,699,686 | B2 | 4/2014 | Goguen et al. | |
| 9,232,374 | B2 | 1/2016 | Haid et al. | |
| 9,591,140 | B1* | 3/2017 | Carlson | H04M 3/565 |
| 9,673,989 | B2* | 6/2017 | Bhow | H04L 12/1818 |
| 2008/0306997 | A1* | 12/2008 | Keohane | G06F 3/0482 |
| 2012/0269334 | A1 | 10/2012 | Goguen et al. | |
| 2013/0040631 | A1* | 2/2013 | Truskovsky | H04M 1/72577 |
| | | | | 455/420 |
| 2013/0331075 | A1* | 12/2013 | Hole | H04W 4/02 |
| | | | | 455/416 |
| 2013/0347053 | A1* | 12/2013 | Motoyama | G06F 21/6218 |
| | | | | 726/1 |
| 2014/0066036 | A1* | 3/2014 | Haid | H04M 3/56 |
| | | | | 455/416 |
| 2014/0169543 | A1 | 6/2014 | Goguen et al. | |
| 2016/0014178 | A1* | 1/2016 | Cholkar | H04N 21/4788 |
| | | | | 348/14.12 |
| 2016/0267439 | A1* | 9/2016 | Bitran | G06Q 10/1093 |
| 2017/0308866 | A1* | 10/2017 | Dotan-Cohen | H04L 43/0876 |
| 2018/0095938 | A1* | 4/2018 | Monte | G06F 3/0488 |
| 2019/0108494 | A1* | 4/2019 | Nelson | G06N 20/00 |

OTHER PUBLICATIONS

U.S. Pat. No. 8,699,686, dated Apr. 15, 2014, is an English language equivalent of CA2771503C, dated Sep. 18, 2012.
US Publication No. 201210269334, dated Oct. 25, 2012, is an English language equivalent of CA2771503C, dated Sep. 18, 2012.
US Publication No. 2014/0169543, dated Jun. 19, 2014, is an English language equivalent of CA2771503C, dated Sep. 18, 2012.

* cited by examiner

INCORPORATING CONTEXTUAL INFORMATION IN A CONFERENCING SYSTEM

BACKGROUND

1. Field

Embodiments relate to the incorporation of contextual information in a conferencing system.

2. Background

Conferencing systems may allow the use of telephones, computers, mobile phones, or other communication devices to allow users at different locations to communicate among themselves. In a telephony based conferencing system, a user may use a communication device, such as landline telephone or a mobile phone to dial a phone number and optionally enter a password such as a code or a pin to join a conference call. Web based conferencing system may be used by users to communicate via computers or smartphones over a network, such as the Internet, for various types of online collaborative services including web seminars, webcasts, web meetings, etc. There are other types of conferencing systems besides telephony based conference systems or Web based conference systems. Additionally, there are conferencing systems that combine or supplement one type of conferencing system with another type of conferencing system. For example, some users may attend at conference via a telephone, whereas other users may attend the same conference via a computer.

SUMMARY OF THE PREFERRED EMBODIMENTS

Provided are a method, a system, a computer program product in which a conference management application for a remote conferencing system stores information on a plurality of users and a plurality of client devices though which the plurality of users communicate with the remote conferencing system. The conference management application transmits information for a remote conference to a user, wherein the information that is transmitted is generated by a cognitive engine via learning mechanisms that iteratively incorporate information on previously completed remote conferences, information on the user, and information on the client device used by the user, to communicate with the conference management application.

In additional embodiments, the conference management application transmits a telephone number or network communication address adapted for a geographical location of the user, wherein the user is requested to use the telephone number or network communication address to connect to the remote conference.

In further embodiments, the conference management application transmits information that indicates to the user a suitable type of device for receiving one or more audio or video presentations during the remote conference.

In yet further embodiments, the conference management application transmits content based on an experience level of the user.

In certain embodiments, the experience level of the user is determined based on the at least one of a job description of the user, an educational level of the user, and participation of the user in other remote conferences.

In additional embodiments, a determination is made from start and end time of previous remote conferences whether the user is likely to be able to attend a new remote conference whose time overlaps a time of an already accepted remote conference on a calendar of the user. In response to determining that the user is likely to be able to attend the new remote conference, the conference management application transmits a calendar invitation to the user for the new remote conference.

In further embodiments questions, answers, and presentations are recorded during the remote conference. The learning mechanisms of the cognitive engine are updated with the recorded questions, answers, and presentations, for use in future remote conferences.

BRIEF DESCRIPTION OF THE DRAWINGS

Referring now to the drawings in which like reference numbers represent corresponding parts throughout.

DETAILED DESCRIPTION

Figure 1:
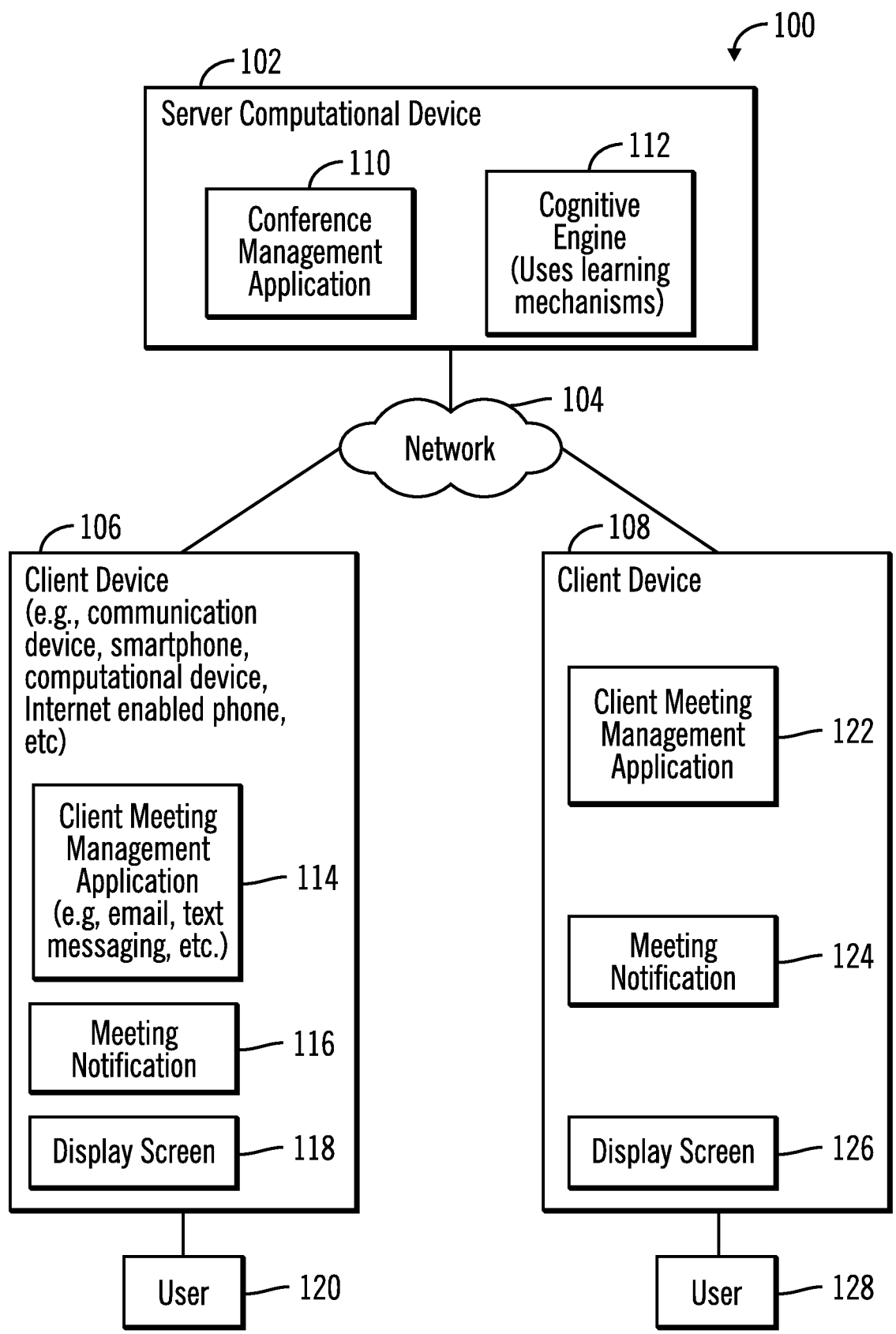
FIG. 1 illustrates a block diagram of a computing environment comprising a conferencing system that includes a server computational device coupled over a network to a plurality of client devices, in accordance with certain embodiments.

In the following description, reference is made to the accompanying drawings which form a part hereof and which illustrate several embodiments. It is understood that other embodiments may be utilized and structural and operational changes may be made.

Business or social entities comprising a plurality of users (e.g., employees, members) may use voice or video meetings as a primary way of communication in a conferencing system. However, when users (i.e., participants) are located across the world, it may be difficult to arrange a meeting among all the users at a specific time slot. To overcome such problems, business or social entities attempt to use available technologies to improve the collaboration between the users. Users may be allowed to access mails or meeting invites or join calls from mobile phone, personal laptops, etc. To allow users to join a meeting from any location or device, meeting invites may include a plurality of call-in numbers, web links, application links, etc. This may confuse certain users and such users may fetch the incorrect call-in numbers or web link.

A few problems that the users may face with the existing applications to join a meeting (or conference call) are listed below:
(1) A user may need to know from where or from which device he is planning to join the meeting, and then determine the right call-in number or the web link or application link.
(2) To secure the exact context of the meeting or previous history (if the meeting is a recurring meeting) of the meeting, the users may manually need to search meeting notes or a history of the meeting.
(3) For a technical presentation or conference, the users may need to refer to informative articles on a topic where the articles are available in the Internet. The users may also need to refer to related links of the topic to obtain some basic information about the topic. If the meeting is a project related meeting, then the users may need to refer to certain project related tools to secure some project related data.
(4) If meeting invite is at personal computer or a laptop and a user wants to join the meeting from a landline phone, then the user may need to manually dial the telephone number and then enter the pin or passcode on the dial pad of the landline phone.

Certain embodiments provide mechanisms to address at least the above problems. With the proposed embodiments, a user may not need to be aware of the joining location and the device from which to join the meeting. A user may join a conference in few clicks without wasting much time in referring and entering call-in details. The conference invite may automatically understand, filter and provide the exact call-in number or web link or application link based on the type of device used by the user or the location of the user and may also suggest the best method that is suitable for the user.

Certain embodiments may utilize a cognitive engine to automatically understand the context of the meeting and the participant knowledge level on the topic, and provide the references or links that the user may refer to during or before the meeting. In certain embodiments a unified access method may be provided for landline phone, and a user may directly secure the call-in number via a few button clicks at the landline.

Exemplary Embodiments

FIG. 1 illustrates a block diagram of a computing environment 100 comprising a comprising a conferencing system that includes a server computational device 102 coupled over a network 104 to a plurality of client devices 106, 108, in accordance with certain embodiments.

The server computational device 102 may comprise any suitable computational device including those presently known in the art, such as, a personal computer, a workstation, a server, a mainframe, a hand held computer, a palm top computer, a telephony device, a network appliance, a blade computer, a processing device, a controller, etc. The network 104 may comprises any suitable network, such as, a wide area network, the Internet, an intranet, a local area network. The client devices 106, 108 may comprise any suitable communication device, such as a smartphone, a computational device, an Internet-enabled phone, a landline phone, etc. In certain embodiments, the server computational device 102 and the client devices 106, 108 may be elements in a cloud computing environment.

The server computational device 102 may include a conference management application 110 and a cognitive engine 112 that communicate with each other. In certain embodiments, the conference management application 110 and the cognitive engine 112 may be implemented in software, hardware, firmware or any combination thereof. The conference management application 110 may provide management services for a conference system accessed by the plurality of client device 106, 108. The cognitive engine 112 may provide learning mechanisms and may be based on various types of artificial intelligence based platforms, such as IBM Watson*.

* IBM, IBM Watson, zSeries, pSeries, xSeries, BladeCenter, WebSphere, and DB2 are trademarks of International Business Machines Corporation registered in many jurisdictions worldwide.

The client device 106 may include a client meeting management application 114 that may display a meeting notification 116 on a display screen 118 to a user 120. The client device 108 may include a client meeting management application 122 that may display a meeting notification 124 on a display screen 126 to a user 128. The client meeting management applications 114, 122 may operate differently in different devices, such as laptops and smartphones, and may provide different types of meeting (or conference) notifications 116, 124.

Figure 2:
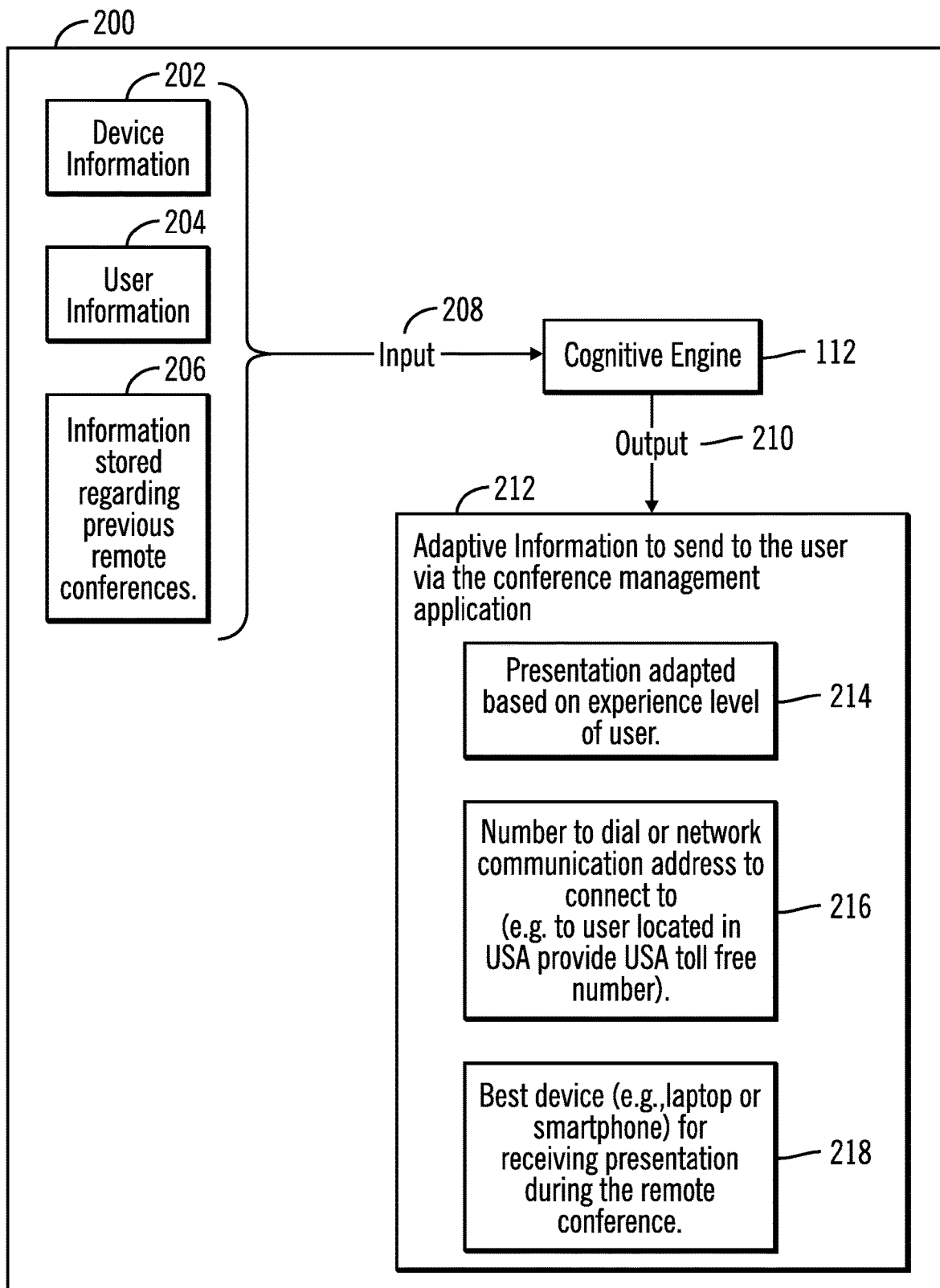
FIG. 2 illustrates a block diagram that shows interactions between a cognitive engine and a conference management application of the server computational device, in accordance with certain embodiments.

FIG. 2 illustrates a block diagram 200 that shows interactions between the cognitive engine 112 and the conference management application 110 of the server computational device 102, in accordance with certain embodiments.

The conference management application 110 provides device information 202, user information 204, and information stored regarding previous remote conferences 206 as input 208 to the cognitive engine 112. The cognitive engine 112 process the inputs 208 and generates outputs 210 for the conference management application 110. The outputs 210 may include adaptive information to send to the user via the conference management application 110. The adaptive information may include presentation that is adapted based on experience level of the user whose user information 204 is provided (as shown via reference numeral 214). The adaptive information may also include the number to dial or the network communication address to connect to (as shown via reference numeral 216). For example, a user located in the Unites States may be provided with a United States toll free number, whereas a user located in Canada may be provided with a Canada toll free number. The adaptive information may also include the best device (e.g., a laptop or a smartphone) for receiving presentations during the remote conference (as shown via reference numeral 218).

Figure 3:
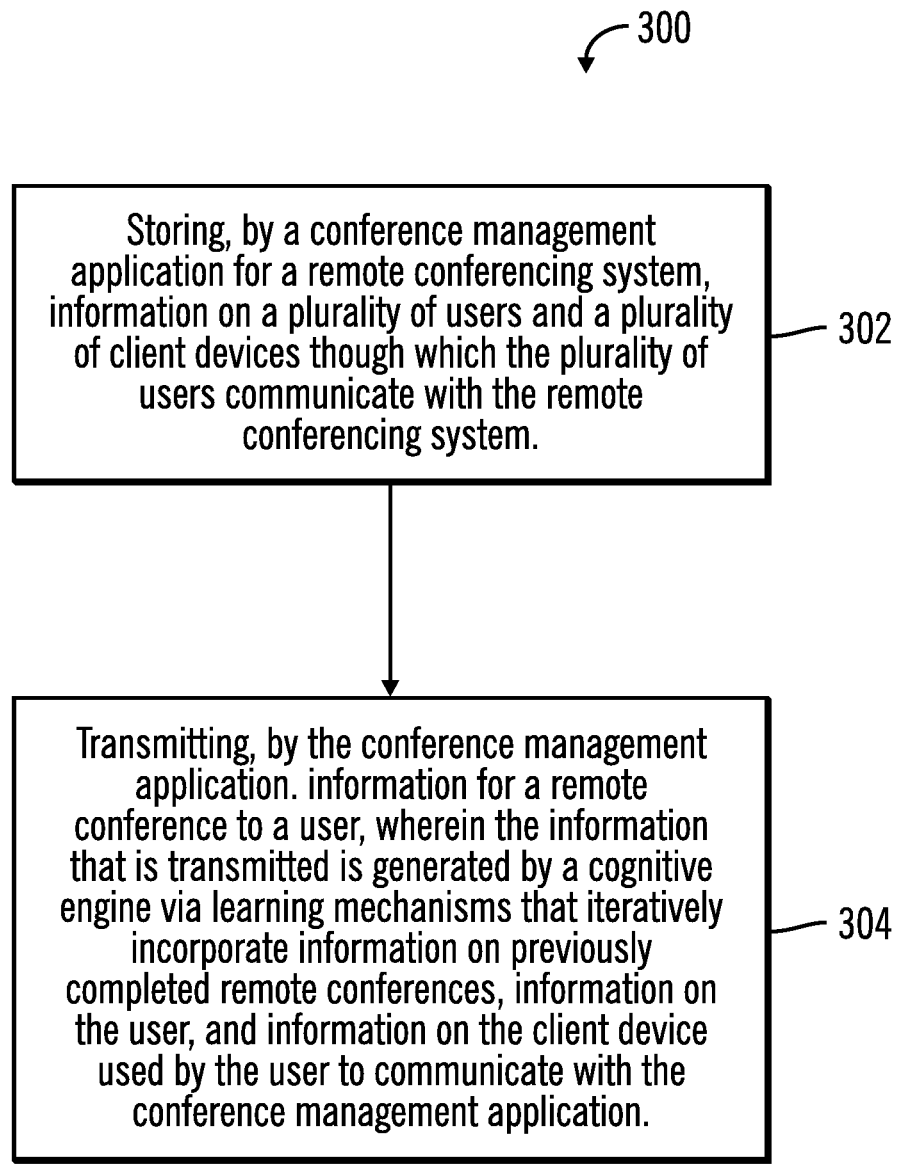
FIG. 3 illustrates a first flowchart that shows operations performed by the conference management application, in accordance with certain embodiments.

FIG. 3 illustrates a first flowchart 300 that shows operations performed by the conference management application 110, in accordance with certain embodiments. In certain embodiments, the operations shown in FIG. 3 may be implemented in the server computational device 102 by the conference management application 110 that provides input and receives output from the cognitive engine 112.

Control starts at block 302 in which a conference management application 110 for a remote conferencing system stores information on a plurality of users and a plurality of client devices though which the plurality of users communicate with the remote conferencing system. The conference management application 110 transmits (at block 304) information for a remote conference to a user, wherein the information that is transmitted is generated by a cognitive engine 112 via learning mechanisms that iteratively incorporate information on previously completed remote conferences, information on the user, and information on the client device used by the user to communicate with the conference management application 110.

Figure 4:
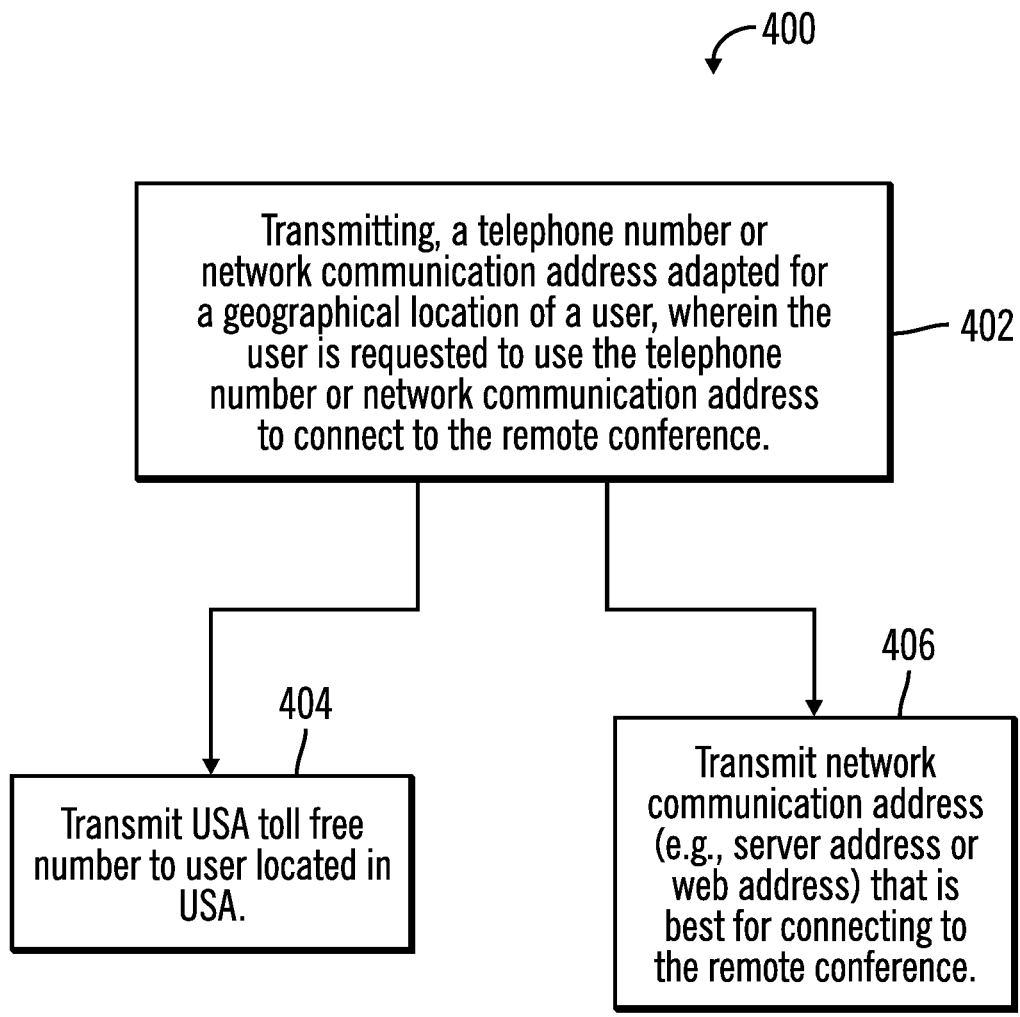
FIG. 4 illustrates a second flowchart that shows operations performed by the conference management application, in accordance with certain embodiments.

FIG. 4 illustrates a second flowchart 400 that shows operations performed by the conference management application 110, in accordance with certain embodiments. In certain embodiments, the operations shown in FIG. 4 may be implemented in the server computational device 102 by the conference management application 110 that provides input and receives output from the cognitive engine 112.

Control starts at block 402 in which the conference management application 110 transmits a telephone number or network communication address adapted for a geographical location of the user, wherein the user is requested to use the telephone number or network communication address to connect to the remote conference. For example, in certain embodiments, the conference management application 110 transmits (at block 404) a USA toll free number to a user located in USA. In certain embodiments the conference management application 110 transmits (at block 406) to a user, a network communication address (e.g., a server address or a web address) that is best for the user for connecting to the remote conference.

Figure 5:
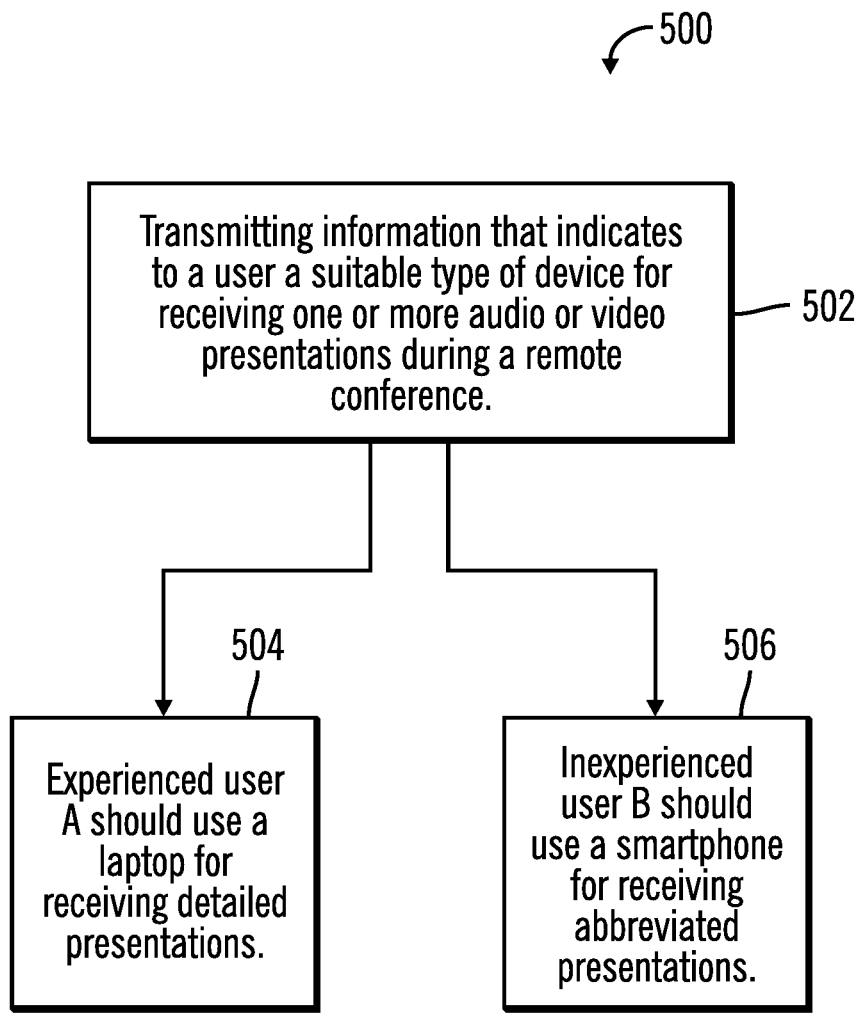
FIG. 5 illustrates a third flowchart that shows operations performed by the conference management application, in accordance with certain embodiments.

FIG. 5 illustrates a third flowchart 500 that shows operations performed by the conference management application 110, in accordance with certain embodiments. In certain embodiments, the operations shown in FIG. 5 may be implemented in the server computational device 102 by the conference management application 110 that provides input and receives output from the cognitive engine 112.

Control starts at block 502 in which the conference management application 110 transmits information that indicates to the user a suitable type of device for receiving one or more audio or video presentations during a remote conference. For example, in certain embodiments an indication may be provided (at block 504) to an experienced user "A" that he should use a laptop for receiving detailed presentations. In certain embodiments an indication may be provided (at block 506) to an inexperienced user "B" that he should use a smartphone for receiving abbreviated presentations.

Figure 6:
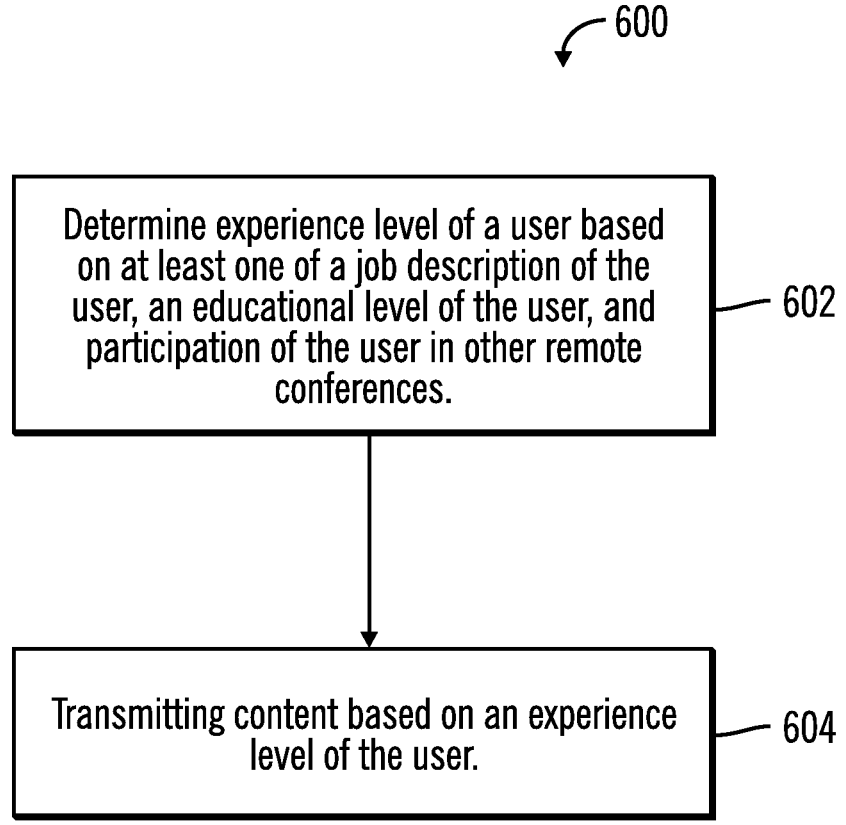
FIG. 6 illustrates a fourth flowchart that shows operations performed by the conference management application, in accordance with certain embodiments.

FIG. 6 illustrates a fourth flowchart that shows operations performed by the conference management application 110, in accordance with certain embodiments. In certain embodiments, the operations shown in FIG. 6 may be implemented in the server computational device 102 by the conference management application 110 that provides input and receives output from the cognitive engine 112.

Control starts at block 602 in which the conference management application 110 determines the experience level of the user based on at least one of a job description of the user, an educational level of the user, and participation of the user in other remote conferences. Control proceeds to block 604 in which the conference management application 110 transmits content based on the determined experience level of the user. For example, complex presentations may be provided to a user with a high experience level, and simple presentations may be provided to a novice user.

Figure 7:
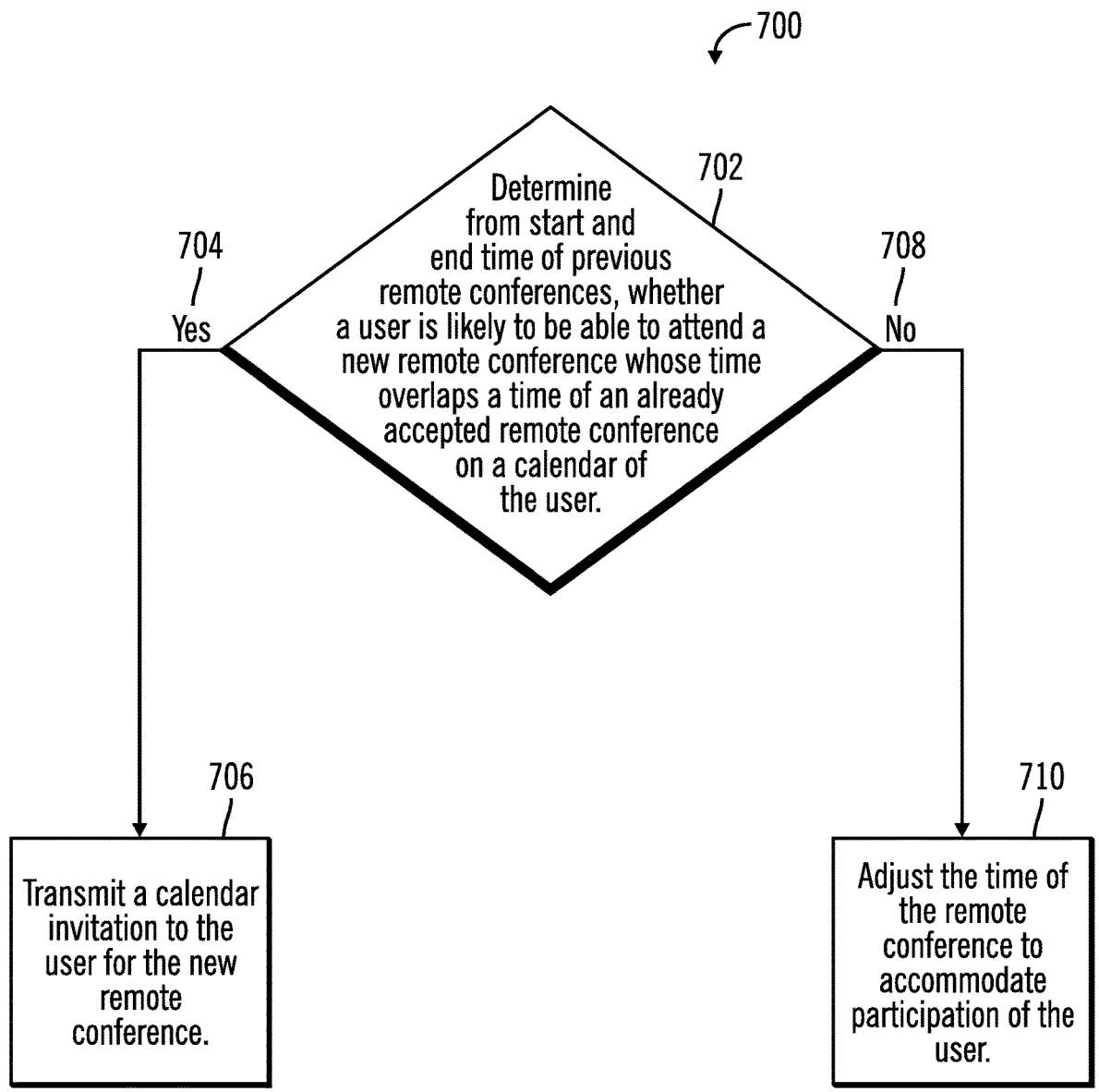
FIG. 7 illustrates a fifth flowchart that shows operations performed by the conference management application, in accordance with certain embodiments.

FIG. 7 illustrates a fifth flowchart 700 that shows operations performed by the conference management application 110, in accordance with certain embodiments. In certain embodiments, the operations shown in FIG. 7 may be implemented in the server computational device 102 by the conference management application 110 that provides input and receives output from the cognitive engine 112.

Figure 8:
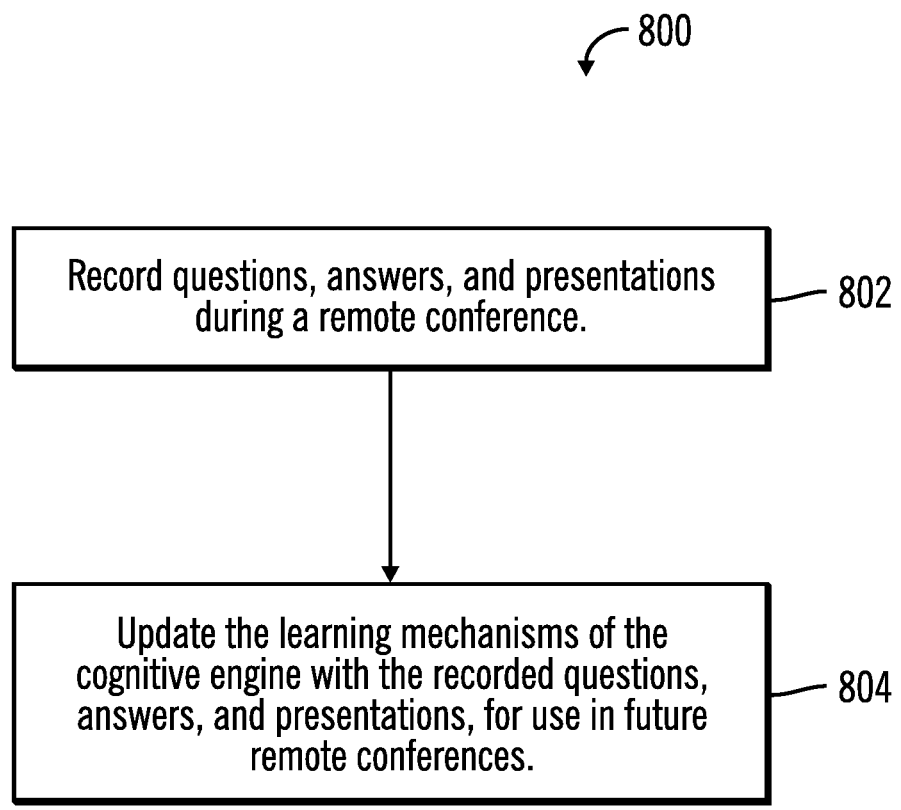
FIG. 8 illustrates a sixth flowchart that shows operations performed by the conference management application, in accordance with certain embodiments.

Control starts at block 702 in which the conference management application 110 determines from start and end time of previous remote conferences whether a user is likely to be able to attend a new remote conference whose time overlaps a time of an already accepted remote conference on a calendar of the user. In response to determining that the user is likely (e.g., previous remote conferences typically did not need the full allotted time) to be able to attend the new remote conference ("Yes" branch 704), the conference management application 110 transmits (at block 706) a calendar invitation to the user for the new remote conference. In response to determining that the user is not likely to be able to attend the new remote conference ("No" branch 708), the conference management application 110 adjusts (at block 706) the time of the remote conference to accommodate the participation of the user FIG. 8 illustrates a sixth flowchart 800 that shows operations performed by the conference management application 110, in accordance with certain embodiments. In certain embodiments, the operations shown in FIG. 8 may be implemented in the server computational device 102 by the conference management application 110 that provides input and receives output from the cognitive engine 112.

Control starts at block 802 in which the conference management application 110 records questions, answers, and presentations during a remote conference. The learning mechanisms of the cognitive engine are updated (at block 804) with the recorded questions, answers, and presentations, for use in future remote conferences.

Therefore, FIGS. 1-8 illustrate certain embodiments in which a conferencing system is improved by a conference management application 110 by utilizing a cognitive engine 112.

Further Embodiments

In certain further embodiments, the following operations may also be implemented in the conference management system described in FIGS. 1-8.
1. Existing applications or mail clients or calendar may be equipped with a cognitive intelligence using Watson* or similar kind of artificial intelligence based learning system.
2. When a meeting invite arrives, a process is started to determine the exact call-in number the user may use to join a meeting.
3. A mail client may provide an application with device location, device type, along with meeting invites or notes.
4. The application may filter call-in details and returns only number which are suitable to the user on that device or return a web link or application link suitable to the device.
5. If the meeting notes has more data and the application determines that it needs further insights, then it may send the meeting invite details to the cognitive engine for analysis.
6. The application may request the mail client for more data about related mails or previous history and the data may be passed to cognitive engine for insights.
7. The cognitive engine is trained with a large number of meeting invites and provides criteria that the application is looking for.
8. Cognitive engine is provided with with feedback information that the application constantly collects from users.

9. The cognitive engine is trained in such a way that it can give insights on the related topics in a quick summery or just related links.

10. Based on the cognitive engine response the application may filter and send back the suitable data to the device or mail client.

11. Since user can view or join the meeting from multiple devices, the embodiments may determine the right device for the user to get best benefit out of a meeting (e.g., if the user uses a mobile phone to join a meeting, then the embodiments may suggest to the user to join from laptop to view the charts better if the chart format is not supported in the mobile phone).

13. If the user has a conflict with meetings/conference, (i.e., more than one meeting/conference at the same time), then the application may also suggest to a user a preferred conference or a preferred meeting.

14. Since the application is constantly learning the meetings or its patterns, the application may suggest the user to accept a new meeting even though the new meeting has a conflict with an existing meeting. For example, if the existing meeting is for an hour but typically has ended in 30 minutes in the past, then the new meeting may be accepted if it starts at least 30 minutes after the start of the new meeting.

15. On a device console user may see only single call-in number or web link, a quick introduction about the meeting, related links, etc.

16. For landline phones, the embodiments may also provide a unique and relatively simple interface to join a call. Many landline phones work over VoIP (Voice over Internet Protocol) and such phones are enhanced in certain embodiments with a logic to interact with the conference management application. An automatic profile login may be created for user of landline telephones. To access the user profile, landline telephones may be equipped with Radio-frequency identification (RFID) or fingerprint based identification. A user can login to any of the devices that are interconnected through a network. When the user logs in to a landline telephone, then the landline telephone may just display the dial number or a meeting invite or may directly ask the user to press "YES" to dial-in to the meeting.

Certain embodiments described above provide improvements to the usability of a graphical user interface of a computational device (e.g., a smartphone, a computer, a telephony device, etc.) by improving the speed and accuracy with which a user can perform the task of setting up and joining meetings and conferences that are conducted remotely over a network. The participants of the meetings and conferences may be located in different time zones, and many different types of displays may be used by users to participate in the meetings and conferences. For example, the display screens 118, 126 shown in FIG. 1 may be of a different size on a smartphone when compared to a laptop, and usability of the displays of both the smartphone as well as the laptop may be improved by at least sending adaptive content to a suitable type of display and by sending the adaptive content based on the experience level of the user (as shown via reference numerals 212, 214, 218 in FIG. 2). The speed and accuracy with which a novice user can interact in a meeting or conference is improved in comparison to systems in which complex content beyond the understanding ability of the novice user is displayed to the novice user. Additionally, by recommending the type of device that is best for attending a meeting or a conference, optimal usage is made of the display capacities of a device. Incorporation of information related to previously completed conferences in later conferences improves the quality of the information displayed on the display screens 118, 126. Additionally, by transmitting the telephone number of a conference adapted for the geographical location of a user, the speed with which a user can join a conference is improved, as the user does not have to analyze multiple telephone numbers displayed on the display screens 118, 126 to determine which telephone number to use for joining the conference. Furthermore, many other specific mechanisms that improve the usability of the graphical user interfaces displayed on the display screens 118, 126 for a user are provided in this disclosure. Specific technical solutions are provided, rooted in the specialized use of a computer display for a remote conferencing system, where the technical solutions improve usability of information displayed for a user on a user interface of a computational device.

Cloud Computing Environment

Cloud computing is a model for enabling convenient, on-demand network access to a shared pool of configurable computing resources (e.g., networks, servers, storage, applications, and services) that can be rapidly provisioned and released with minimal management effort or service provider interaction.

Figure 9:
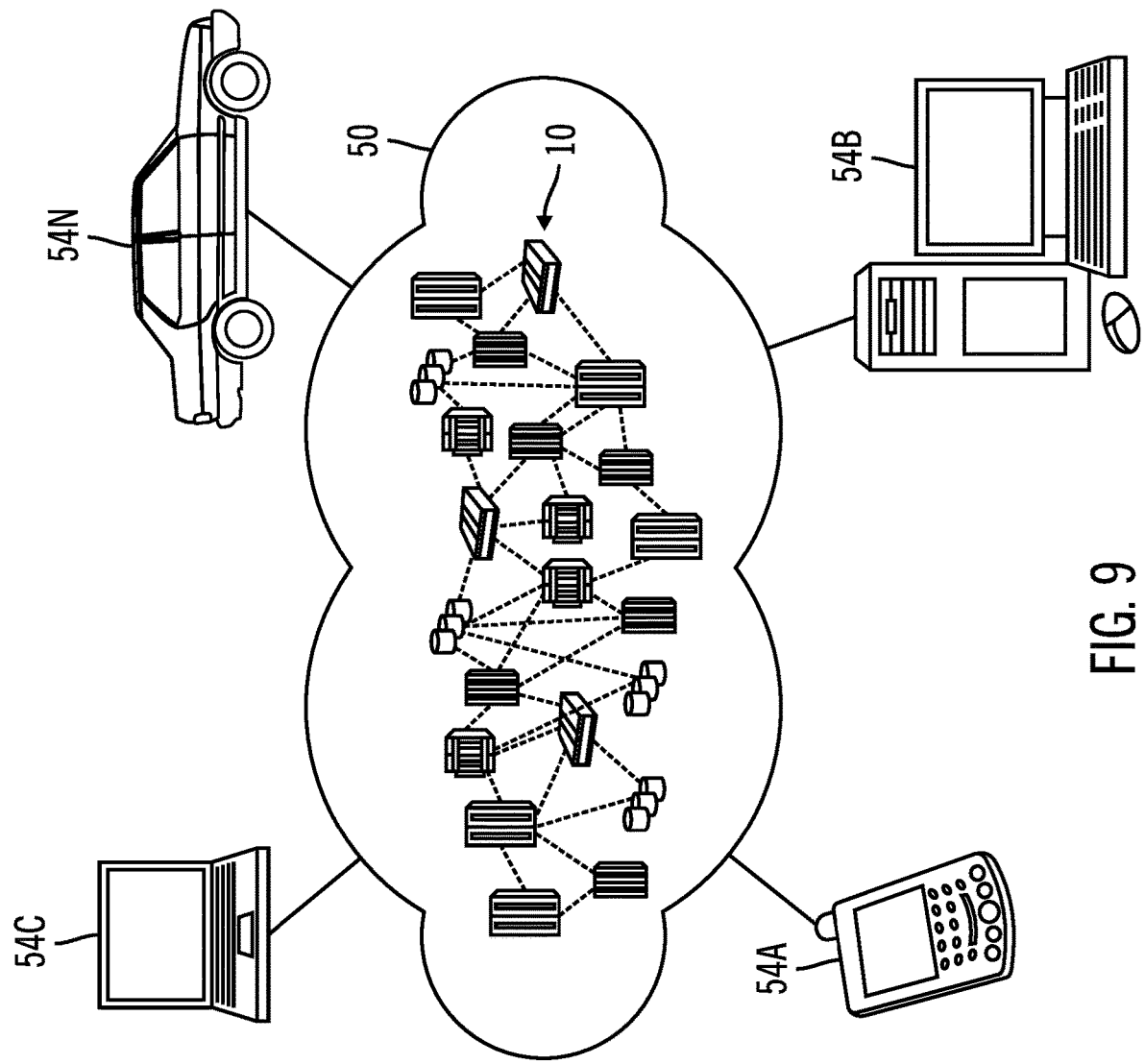
FIG. 9 illustrates a block diagram of a cloud computing environment, in accordance with certain embodiments.

Referring now to FIG. 9, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Figure 10:
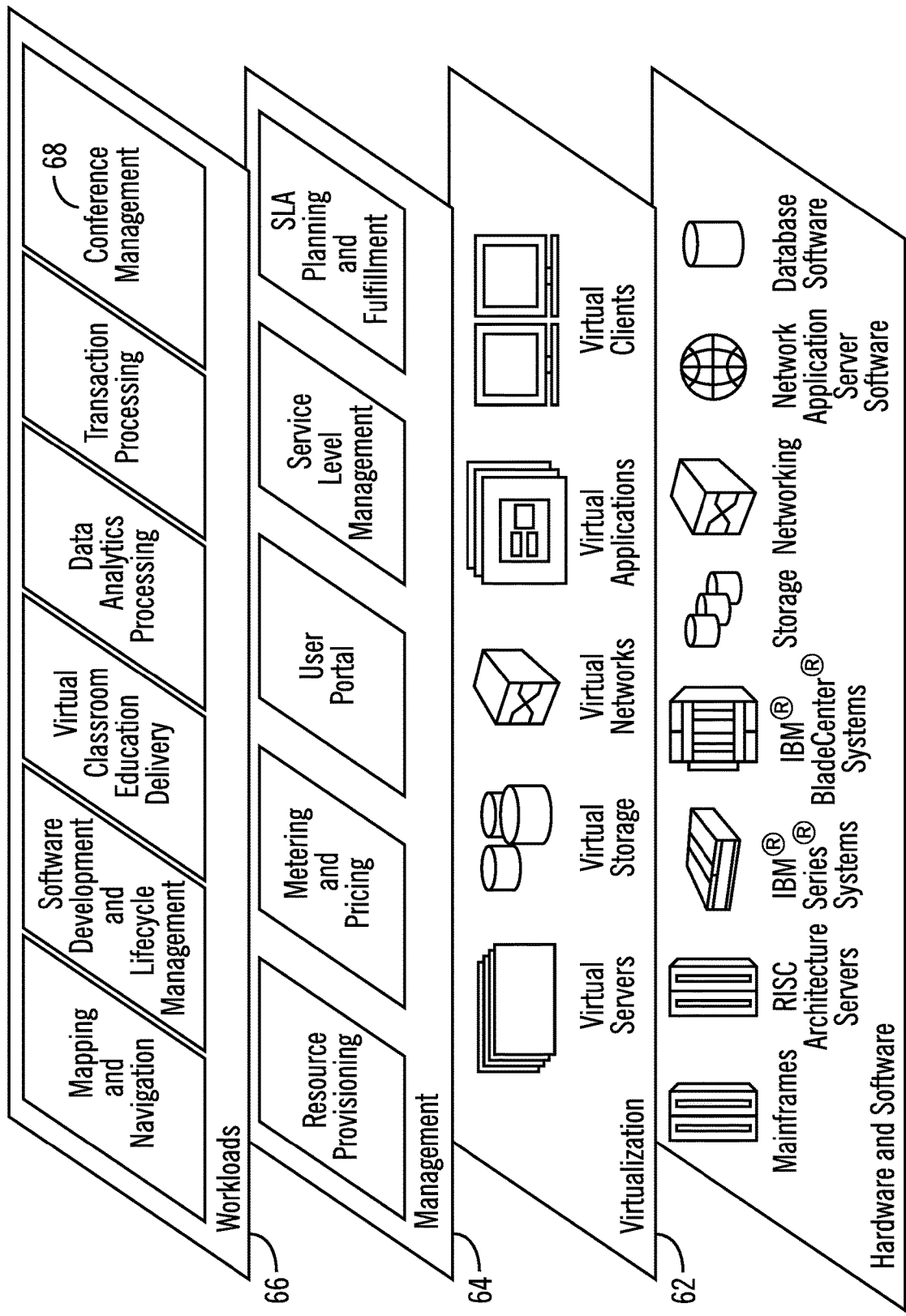
FIG. 10 illustrates a block diagram of further details of the cloud computing environment of FIG. 9, in accordance with certain embodiments.

Referring now to FIG. 10 a set of functional abstraction layers provided by cloud computing environment 50 (FIG. 9) is shown. It should be understood in advance that the components, layers, and functions shown in FIG. 9 are intended to be illustrative only and embodiments of the invention are not limited thereto.

Hardware and software layer 60 includes hardware and software components. Examples of hardware components include mainframes, in one example IBM zSeries* systems; RISC (Reduced Instruction Set Computer) architecture based servers, in one example IBM pSeries* systems; IBM xSeries* systems; IBM BladeCenter* systems; storage devices; networks and networking components. Examples of software components include network application server software, in one example IBM WebSphere* application server software; and database software, in one example IBM DB2* database software.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and conference management 68 as shown in FIGS. 1-9.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instruction.

Figure 11:
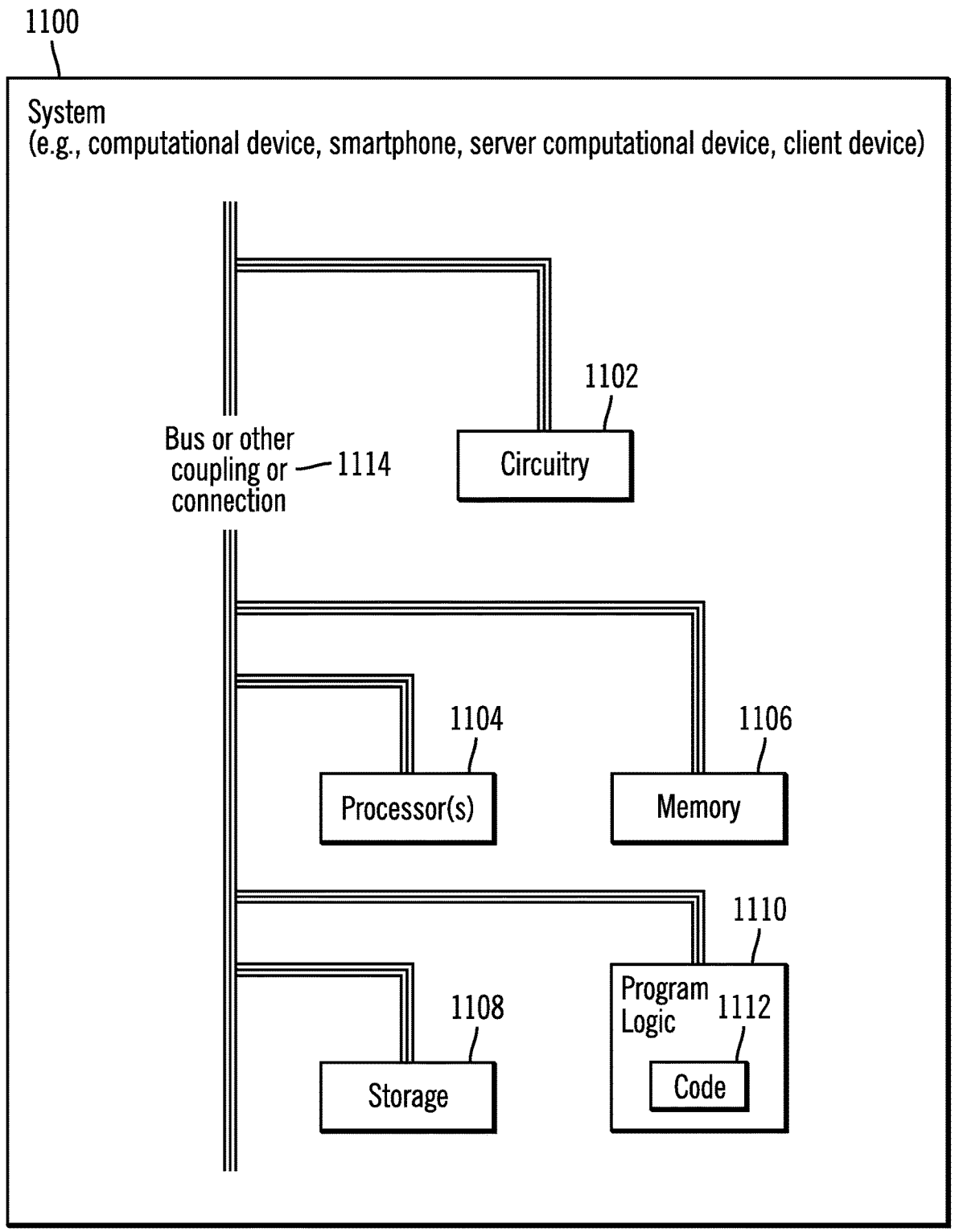
FIG. 11 illustrates a block diagram of a computational system that shows certain elements that may be included in the server computational device or the client devices, as described in FIG. 10, in accordance with certain embodiments.

FIG. 11 illustrates a block diagram that shows certain elements that may be included in the server computational device 102 or client devices 106, 108 or other devices in accordance with certain embodiments. The system 1100 may include a circuitry 1102 that may in certain embodiments include at least a processor 1104. The system 1100 may also include a memory 1106 (e.g., a volatile memory device), and storage 1108. The storage 1108 may include a non-volatile memory device (e.g., EEPROM, ROM, PROM, flash, firmware, programmable logic, etc.), magnetic disk drive, optical disk drive, tape drive, etc. The storage 1108 may comprise an internal storage device, an attached storage device and/or a network accessible storage device. The system 1100 may include a program logic 1110 including code 1112 that may be loaded into the memory 1106 and executed by the processor 1104 or circuitry 1102. In certain embodiments, the program logic 1110 including code 1112 may be stored in the storage 1108. In certain other embodiments, the program logic 1110 may be implemented in the circuitry 1102. One or more of the components in the system 1100 may communicate via a bus or via other coupling or connection 1114. Therefore, while FIG. 11 shows the program logic 1110 separately from the other elements, the program logic 1110 may be implemented in the memory 1106 and/or the circuitry 1102.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:

storing, by a conference management application for a remote conferencing system, information on a plurality of users and a plurality of client devices though which the plurality of users communicate with the remote conferencing system;

transmitting, by the conference management application, information for a remote conference to a user, wherein the information that is transmitted is generated by a cognitive engine via learning mechanisms that iteratively incorporate information on previously completed remote conferences, information on the user, and information on the client device used by the user, to communicate with the conference management application;

in response to determining that the user has connected to the remote conference via a first client device that is incapable of displaying a first information segment in a first format that is expected to be used in the remote conference, communicating to the user to join the remote conference via a second client device that is capable of displaying the first information segment in the first format, wherein a landline phone is configured with logic to interact with the conference management application over a Voice over Internet Protocol, and wherein in response to the user logging in to the landline phone, the landline phone displays a dial in number to dial-in to the remote conference; and determining from start and end time of previous remote conferences, whether the user is likely to be able to attend a new remote conference whose time overlaps a time of an already accepted remote conference on a calendar of the user;

in response to determining that the user is likely to be able to attend the new remote conference, transmitting a calendar invitation to the user for the new remote conference;

in response to determining that the user is not likely to be able to attend the new remote conference, adjusting the time of the remote conference to accommodate participation by the user; and sending a suggestion, by the conference management application, to the user, to accept the new remote conference even though the new remote conference has a conflict with an existing remote conference, in response to determining that the existing remote conference has previously ended earlier than a start time of the new remote conference.

2. The method of claim 1, the method further comprising: transmitting a network communication address adapted for a geographical location of the user, wherein the user is requested to use the network communication address to connect to the remote conference, and wherein the network communication address is adapted to the geographical location of the user by providing the user with a Web address that is best among a plurality of Web addresses for the user to connect to the remote conference.

3. The method of claim 1, the method further comprising: transmitting content based on an experience level of the user.

4. The method of claim 3, wherein the experience level of the user is determined based on the at least one of a job description of the user, an educational level of the user, and participation of the user in other remote conferences.

5. The method of claim 1, the method further comprising: recording questions, answers, and presentations during the remote conference; and updating the learning mechanisms of the cognitive engine with the recorded questions, answers, and presentations, for use in future remote conferences.

6. A system, comprising:

a memory; and a processor coupled to the memory, wherein the processor performs operations, the operations comprising:

storing, by a conference management application for a remote conferencing system, information on a plurality of users and a plurality of client devices though which the plurality of users communicate with the remote conferencing system;

transmitting, by the conference management application, information for a remote conference to a user, wherein the information that is transmitted is generated by a cognitive engine via learning mechanisms that iteratively incorporate information on previously completed remote conferences, information on the user, and information on the client device used by the user, to communicate with the conference management application;

in response to determining that the user has connected to the remote conference via a first client device that is incapable of displaying a first information segment in a first format that is expected to be used in the remote conference, communicating to the user to join the remote conference via a second client device that is capable of displaying the first information segment in the first format, wherein a landline phone is configured with logic to interact with the conference management application over a Voice over Internet Protocol, and wherein in response to the user logging in to the landline phone, the landline phone displays a dial in number to dial-in to the remote conference; and determining from start and end time of previous remote conferences, whether the user is likely to be able to attend a new remote conference whose time overlaps a time of an already accepted remote conference on a calendar of the user;

in response to determining that the user is likely to be able to attend the new remote conference, transmitting a calendar invitation to the user for the new remote conference;

in response to determining that the user is not likely to be able to attend the new remote conference, adjusting the time of the remote conference to accommodate participation by the user; and sending a suggestion, by the conference management application, to the user, to accept the new remote conference even though the new remote conference has a conflict with an existing remote conference, in response to determining that the existing remote conference has previously ended earlier than a start time of the new remote conference.

7. The system of claim 6, the operations further comprising: transmitting a network communication address adapted for a geographical location of the user, wherein the user is requested to use the network communication address to connect to the remote conference, and wherein the network communication address is adapted to the geographical location of the user by providing the user with a Web address that is best among a plurality of Web addresses for the user to connect to the remote conference.

8. The system of claim 6, the operations further comprising:
   transmitting content based on an experience level of the user.

9. The system of claim 8, wherein the experience level of the user is determined based on the at least one of a job description of the user, an educational level of the user, and participation of the user in other remote conferences.

10. The system of claim 6, the operations further comprising:
   recording questions, answers, and presentations during the remote conference; and
   updating the learning mechanisms of the cognitive engine with the recorded questions, answers, and presentations, for use in future remote conferences.

11. A computer program product, the computer program product comprising a computer readable storage medium having computer readable program code embodied therewith, the computer readable program code configured to perform operations on a processor, the operations comprising:
   storing, by a conference management application for a remote conferencing system, information on a plurality of users and a plurality of client devices though which the plurality of users communicate with the remote conferencing system;
   transmitting, by the conference management application, information for a remote conference to a user, wherein the information that is transmitted is generated by a cognitive engine via learning mechanisms that iteratively incorporate information on previously completed remote conferences, information on the user, and information on the client device used by the user, to communicate with the conference management application;
   in response to determining that the user has connected to the remote conference via a first client device that is incapable of displaying a first information segment in a first format that is expected to be used in the remote conference, communicating to the user to join the remote conference via a second client device that is capable of displaying the first information segment in the first format, wherein a landline phone is configured with logic to interact with the conference management application over a Voice over Internet Protocol, and wherein in response to the user logging in to the landline phone, the landline phone displays a dial in number to dial-in to the remote conference; and
   determining from start and end time of previous remote conferences, whether the user is likely to be able to attend a new remote conference whose time overlaps a time of an already accepted remote conference on a calendar of the user;
   in response to determining that the user is likely to be able to attend the new remote conference, transmitting a calendar invitation to the user for the new remote conference;
   in response to determining that the user is not likely to be able to attend the new remote conference, adjusting the time of the remote conference to accommodate participation by the user; and
   sending a suggestion, by the conference management application, to the user, to accept the new remote conference even though the new remote conference has a conflict with an existing remote conference, in response to determining that the existing remote conference has previously ended earlier than a start time of the new remote conference.

12. The computer program product of claim 11, the operations further comprising:
   transmitting a network communication address adapted for a geographical location of the user, wherein the user is requested to use the network communication address to connect to the remote conference, and wherein the network communication address is adapted to the geographical location of the user by providing the user with a Web address that is best among a plurality of Web addresses for the user to connect to the remote conference.

13. The computer program product of claim 11, the operations further comprising: transmitting content based on an experience level of the user.

14. The computer program product of claim 13, wherein the experience level of the user is determined based on the at least one of a job description of the user, an educational level of the user, and participation of the user in other remote conferences.

15. The method of claim 1, wherein the landline phone is equipped with fingerprint based identification to access a profile of the user.

16. The system of claim 6, wherein the landline phone is equipped with fingerprint based identification to access a profile of the user.

17. The computer program product of claim 11, wherein the landline phone is equipped with fingerprint based identification to access a profile of the user.

* * * * *